United States Patent Office 3,676,132

Patented July 11, 1972

3,676,132

THERMOGRAPHIC REPRODUCTION MATERIAL AND PROCESS

Siegfried Scheler, 120 Schonaustrasse, Wiesbaden-Schierstein, Germany, and Johannes Munder, 13 Lohmuhlweg, Wiesbaden-Biebrich, Germany No Drawing. Continuation of abandoned application Ser. No. 690,756, Dec. 15, 1967. This application Dec. 1, 1970, Ser. No. 94,186
Claims priority, application Germany, Dec. 15, 1966, K 60,929
Int. Cl. G03c *1/58, 5/52, 5/34*
U.S. Cl. 96—49 11 Claims

ABSTRACT OF THE DISCLOSURE

A thermographic material capable of fixing against post-imaging heat effects is prepared by coating a transparent natural paper support with a composition comprising a heat- and light-sensitive diazo compound and an organic acid. Thermographic exposure to infrared radiation results in the formation of an opaque decomposition image in the support. Post-imaging exposure to actinic light decomposes the diazo compound without image formation to render the material insensitive to subsequent heating.

This is a continuation of Ser. No. 690,756, filed Dec. 15, 1967, now abandoned.

BACKGROUND OF THE INVENTION

It is known to prepare reflex copies by a thermographic process from opaque originals or originals having graphic intelligence on both sides. The reproduction material used in this case contains substances which, upon differentiated exposure to heat or infrared radiation, fuse or undergo chemical changes and thus make the image visible. Such processes have the disadvantage that they either require a transfer sheet and a receptor sheet or that the resulting copies cannot be stabilized with respect to further heating or that the material has a relatively complicated layer construction or its manufacture is difficult and requires much care.

It is further known in the diazotype field to prepare opaque gas vesicle images according to the so-called vesicular process. The reproduction material to be processed according to this process consists of a base sheet carrying a layer of a suitable thermoplastic binder and a substance photolyzable with splitting off nitrogen, e.g. a diazonium salt. Development is effected by heating, the nitrogen split off during preceding exposure to light forming vesicles in the binder according to the image-wise exposure to light. The impression of the image is caused by the varying light refraction in the image areas which are interspersed with gas vesicles. Since such a diffusion of light particularly acts upon the light portions of a shorter wave length, the images are good for covering against ultraviolet light and thus suitable for making further copies on diazotype material. The process involves the use of a transparent thermoplastic binder having special properties and a transparent sheet as the support. Sensitizing generally has to be performed with the use of an organic solvent.

Furthermore, it is known that photolysis of diazonium compounds of the p-phenylenediamine type leads to the formation of colourless light decomposition products whereas thermolysis of the said diazo compounds leads to the formation of coloured heat reaction products. These different photolytic and thermolytic behaviours of these diazo compounds are the basis of a reproduction process using one-component diazotype layers, which is described in U.S. Pat. No. 3,164,469. According to this process, the diazotype material which contains diazonium salts of p-phenylenediamines is image-wise exposed to light and the diazo compound not decomposed by the action of light is then converted into a dyestuff by the action of heat. The resulting dyestuffs, however, have a relatively low colouring power; the stabilizability of the material is also limited.

An object of the present invention is a thermographic reproduction material for the preparation of transparent copies, which consists of a transparent paper support and a reproduction layer coated thereon of a light-sensitive diazo compound.

SUMMARY OF THE INVENTION

The present invention furthermore provides a thermographic process for the preparation of reflex copies using the said material, which process comprises image-wise exposing the material to heat in a reflex process and then, if desired, fixing the resulting copy by fully exposing the whole area to light.

The process yields copies consisting of opaque, light-dispersing image areas on a transparent background.

For the preparation of such a copy, the reproduction material of the present invention is so placed between an infrared source and the reproduction original that the surface of the reproduction original which carries the image is brought into contact either with the reproduction layer or with the surface of the reproduction material which is away from the reproduction layer. The acting infrared rays are absorbed in the darker image areas of the reproduction original. The resulting heating is sufficient to image-wise change the structure of the trasparent reproduction material so that, where the image areas of the reproduction original are facing the reproduction material, an opaque image is obtained. The thus obtained thermographic reflex copy may be fixed by subsequently exposing the whole area to light. A special fixation step may, of course, be dispensed with when the finished thermographic copy is exposed to sunlight in any case.

When the fixed copy is seen by reflection a light image appears on a darker background and, when it is seen by transmitted light, a dark image appears on a ligher background.

The copy prepared in this manner may be used as a single copy, as a projection transparent and—due to the high light-dispersion of the opaque image areas—particularly as an intermediate original for making further copies on diazotype material.

Whereas according to the above-described vesicular process, the opaque gas vesicle images are produced in the thermoplastic binder layer by image-wise exposure to light and subsequent exposure to heat, according to the new process described here, the opaque images result from an irreversible structure change of the support material, which probably is caused by a chemical interaction between the support and the decomposition products obtained by image-wise thermolysis of the diazo compound. The use of a natural transparent fibrous material is necessary in any case for the performance of the process of the invention. In order to obtain intimate contact between the fibers of the paper support and the diazo compound, precoating layers on the support are to be avoided.

Suitable diazo compounds in the reproduction layer of the material of the present invention are the diazo compounds generally used in the diazotype field, the water-soluble compounds being preferred. Such diazo compounds are, for example:

4-benzoylamino-2,5-diethoxy-benzene-diazonium-chloride,
4-phenylamino-benzene-diazonium-chloride,
4-phenylamino-benzene-diazonium-hydrogen-sulphate,
4-diazo-2,5-dimethoxy-4′-methyl-diphenyl-sulphide,
4-morpholino-benzene-diazonium-fluoroborate,
4-morpholino-2,5-diethoxy-benzene-diazonium-chloride,
4-piperidino-benzene-diazonium-chloride,
4-(4′-ethoxyphenyl)-2,5-diethoxy-benzene-diazonium-chloride,
4-(N-ethyl-N-benzyl)amino-benzene-diazonium-chloride,
4-dimethylamino-benzene-diazonium-chloride,
4-dimethylamino-3-methoxy-benzene-diazonium-chloride,
4-pyrrolidino-3-(3′-diethylamino-2′-hydroxy)propoxy-benzene-diazonium-chloride,
4-diethylamino-2-ethoxy-benzene-diazonium-chloride,
1,2-naphthoquinone-2-diazide-5-sulphonic acid,
1,2-naphthoquinone-2-diazide-4-sulphonic acid,
7-dimethylamino-3-oxo-2,4-dihydro-benzo-1,4-thiazine-6-diazonium-chloride The above-mentioned diazonium chlorides are preferably used in the form of their metal halide double salts, the naphthoquinone diazide sulphonic acids in form of their alkali metal salts. The diazo compounds may also be used in admixture.

In combination with the diazo compound, the material of the present invention includes acids in amounts generally greater than are normally used merely for stabilizing the usual diazotype dye-forming compositions. Approximately equal parts of diazo compound and acid are useful. Such acids as citric, tartaric, sulphosalicylic, sulphamic, and boric may be used. Increasing the quantity of acid tends to increase the density of the opaque destruction image while reducing the degree of colour image produced.

In addition to the diazo compound and the acid, the reproduction layer may contain stabilizing additives customary in diazotype materials, such as naphthalene-1,3,6-trisulphonic acid (sodium salt), zinc chloride, thiourea, etc. It is furthermore advantageous for coating the support to add to the aqueous sensitizing solution small quantities of water-soluble polymer substances, e.g. methyl cellulose, carboxymethyl cellulose, starch, polyvinyl alcohol, etc., so that the diazo compound can be better coated on the support.

Particularly favourable results are achieved when the used aqueous sensitizing solution contains 3 to 5 parts by weight of diazo compound, 2 to 5 parts by weight of acid additives, and 1 to 2 parts by weight of polyvinyl alcohol. After image-wise exposure to heat and subsequent full exposure of the whole area to light, a transparent paper coated with a sensitizing solution of this composition yields opaque destruction images of the support material, which images, depending on the particular diazo compound used, appear more or less intensely coloured on the coated surface. By suitable selection of the ratio by weight of diazo compound/acid additives it is thus possible to prepare colourless opaque or coloured opaque destruction images of the support. The shade and the intensity of the colour furthermore depend upon the nature of the diazo compound. A particularly high covering power have such materials the diazo compounds of which yield yellowish or brownish coloured decomposition products.

As supports there are advantageously used the finely ground transparent papers customary in the diazotype field, which have a residual water content of 2 to 20 percent, preferably of 4 to 12 percent.

It has furthermore been found that a small addition of thermolabile substances to the reproduction layer, particularly of such substances which split off acid substances, e.g. hydrogen chloride or hydrogen bromide, during heating, favourably influences the formation of opaque destruction images of the support. The addition of such thermolabile substances may considerably reduce the time of action of image-wise heat exposure and the radiation performance of the infrared source. Suitable thermolabile additives of the above-mentioned type are, e.g. trichloro- and tribromoacetic acid as well as their sodium, potassium, and $NH_4$ salts.

The thermographic reflex reproduction material exhibits a good storage stability.

PREFERRED EMBODIMENTS

Example 1

A conventional finely ground natural transparent diazotype paper was coated on one side with a solution of the following composition:

| | Parts by weight |
|---|---|
| Water | 100 |
| Citric acid | 3 |
| 4-morpholino-benzene-diazonium-fluoroborate | 5 |

The coated support was dried at 60 to 70° C. in an air stream. In a commercially available thermocopying machine (Thermofax-Assistant), the material was then placed between the infrared source and a graphic reproduction original with the coated surface on the graphic image of the reproduction original and exposed to radiation. The unused diazo compound was destroyed by subsequent full exposure of the whole area to light.

A copy with opaque graphic characters having sharply defined margins was obtained on an almost colourless transparent background, which copy was dark when seen by transmitted light and, when seen by reflection, colourless and right-reading from the back of the copy and violet-tinged blue and reversed from the coated surface of the copy.

The graphic characters are impermeable to ultraviolet radiation, for which reason such a copy is excellently suitable as an intermediate original for making further copies on diazotype materials.

Copies of equal quality were obtained when the diazo compounds used were the zinc chloride double salts of 4-morpholino-2,5-dimethoxy-benzene-diazonium-chloride,
4-morpholino-2,5-diethoxy-benzene-diazonium-chloride,
4-morpholino-2,5-dibutoxy-benzene-diazonium-chloride,
4-benzoylamino-2,5-diethoxy-benzene-diazonium-chloride or
4-diazo-2,5-dimethoxy-4′-methyl-diphenyl-sulphide.

Example 2

A conventional natural blue coloured transparent diazotype paper was coated on one side with a solution of the following composition:

| | Parts by weight |
|---|---|
| Water | 100 |
| Citric acid | 3 |
| Sulphosalicylic acid | 2 |
| Polyvinyl alcohol (Mowiol N 30–88 of Farbwerke Hoechst AG) | 2 |
| Double salt from zinc chloride and 4 - (N - ethyl-N-β - hydroxyethyl)amino-benzene-diazonium-chloride | 5 |

The thus coated support was dried at 60 to 70° C. in an air stream and then, as described in Example 1, image-wise exposed to heat in a thermocopying machine and subsequently entirely exposed to light.

A copy with opaque images having sharply defined margins was obtained on a blue coloured transparent background, which copy appeared dark with transmitted light and colourless with reflected light. The copy is well suited as an intermediate original for making further copies on diazotype materials.

The zinc chloride double salts of the following diazo compounds were employed with equal success:

4-dimethyl-amino-3-methoxy-benzene-diazonium-chloride,
4-pyrrolidino-3-(3'-diethylamino-2'-hydroxy)propoxy-benzene-diazonium-chloride or
7-dimethylamino-3-oxo-2,4-dihydro-benzo-1,4-thiazine-6-diazonium-chloride.

Example 3

Natural transparent paper was coated on one side with a solution of the following composition:

| | Parts by weight |
|---|---|
| Water | 100 |
| Tartaric acid | 3 |
| Polyvinyl alcohol (Mowiol N 30–88 of Farbwerke Hoechst AG) | 2 |
| Double salt from zinc chloride and 4-piperidino-benzene-diazonium chloride | 5 |

The coated support was dried at 60 to 70° C. in an air stream. The reproduction material was then placed in a thermocopying machine between the infrared source and a graphic reproduction original in a manner such that the graphic characters of the reproduction original were in contact with the side of the diazotype material which was away from the light-sensitive layer. The unused diazo compound was then destroyed by exposure to light.

A copy with opaque graphic characters on a light yellowish transparent background was obtained. The graphic characters appeared dark when seen by transmitted light and, when seen by reflection, light-yellow and right-reading from the coated side of the copy and almost colourless and reversed from the back of the copy.

Since the graphic characters are impermeable to ultraviolet radiation, such a copy is excellently suitable as an intermediate original for making further copies on diazotype materials. Copies with a similar colour shading and of equally good quality were obtained when using the following diazo compounds:

4-(N-ethyl-N-benzyl)amino-benzene-diazonium-chloride (zinc chloride double salt),
4 - phenylamino-benzene-diazonium-hydrogen-sulphate or
4-ethyl-amino-3-methyl-benzene-diazonium-chloride (zinc chloride double salt).

Example 4

Natural blue coloured transparent paper was coated on one side with a solution of the following composition:

| | Parts by weight |
|---|---|
| Water | 100 |
| Citric acid | 3 |
| Naphthalene-1,3,6-trisulphonic acid (sodium salt) | 2 |
| Trichloroacetic acid | 1 |
| Methyl cellulose (10 centipoises/20° C.) | 1 |
| 1,2-naphthoquinone-2-diazide-5-sulphonic acid (sodium salt) | 5 |

The coated support was dried at 60 to 70° in an air stream and then, as described in Example 3, image-wise exposed to heat in a thermocopying machine and subsequently entirely exposed to an ultraviolet light source.

The resulting copy showed opaque graphic characters on a blue coloured transparent background.

When seen by transmitted light, the images appear dark, when seen by reflection, however, reddish brown and right-reading from the coated side of the copy and colourless and reversed from the back of the copy.

Since the image areas are impermeable to ultraviolet radiation, such a copy is excellently suitable as an intermediate original for making further copies on diazotype materials.

If the diazo compound used in the light-sensitive layer is 1,2-naphthoquinone-2-diazide-4-sulphonic acid (sodium salt), a copy of equal quality and similar colour shading on the side carrying the layer is obtained.

Example 5

Natural transparent paper was coated on one side with a solution of the following composition:

| | Parts by weight |
|---|---|
| Water | 100 |
| Citric acid | 3 |
| Naphthalene-1,3,6-trisulphonic acid (sodium salt) | 2 |
| Polyvinyl alcohol (Mowiol N 30–88 of Farbwerke Hoechst AG) | 2 |
| 1,2-naphthoquinone-2-diazide-5-sulphonic acid (sodium salt) | 2.5 |
| 4-morpholino-benzene-diazonium-fluoroborate | 2.5 |

The coated support material was dried at 60 to 70° C. in an air stream and then, in a thermocopying machine, as described in Example 1, brought into contact with a graphic reproduction original and subsequently entirely exposed to light.

A copy with opaque graphic characters on a light brownish coloured transparent background was obtained. The graphic characters appeared dark when seen by transmitted light and, when seen by reflection, colourless and right-reading from the back of the support and light brown and reversed from the coated side of the copy.

Since the opaque graphic characters excellently absorb ultraviolet radiation, the resulting copy could be used as an intermediate original for making further copies.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Thermographic reproduction material comprising a transparent natural paper support having a coating thereon in intimate contact with the fibers of the support, the coating comprising a light-sensitive and heat-sensitive diazo compound and an organic acid present in a quantity in the range of about 0.5 to 2.0 parts per part by weight of the diazo compound.

2. Material according to claim 1 in which the coating contains a thermolabile acid-producing compound.

3. Material according to claim 2 in which the acid-producing compound is selected from the group consisting of halogen acetic acids and the sodium, potassium, and ammonium salts thereof.

4. Material according to claim 1 in which the coating contains a water-soluble polymer.

5. Material according to claim 4 in which the polymer is polyvinyl alcohol.

6. A process for preparing a graphic image which comprises imagewise heating a thermographic reproduction material to a temperature and for a time sufficient to thermally decompose a diazo compound contained therein, the reproduction material comprising a transparent natural paper support having a coating thereon in intimate contact with the fibers of the support, the coating comprising a light-sensitive and heat-sensitive diazo compound and an organic acid present in a quantity in the range of about 0.5 to 2.0 parts per part by weight of the diazo compound.

7. A process according to claim 6 in which the coating contains a thermolabile acid-producing compound.

8. A process according to claim 7 in which the acid-producing compound is selected from the group consisting of halogen acetic acids and the sodium, potassium, and ammonium salts thereof.

9. A process according to claim 6 in which the coating contains a water-soluble polymer.

10. A process according to claim 9 in which the polymer is polyvinyl alcohol.

11. A process according to claim 6 in which, after imagewise heating, the unheated areas of the material are exposed to actinic light to decompose the diazo compound in said areas.

References Cited

UNITED STATES PATENTS

| | | | |
|---|---|---|---|
| 2,657,141 | 10/1953 | Kessels | 96—91 |
| 2,911,299 | 11/1959 | Baril et al. | 96—49 |
| 2,993,805 | 7/1961 | Kay | 96—49 X |
| 3,164,469 | 1/1965 | Behmenburg | 96—49 |
| 3,208,850 | 9/1965 | Daech | 96—75 X |
| 3,309,200 | 3/1967 | Berman et al. | 96—91 X |
| 3,389,996 | 6/1968 | Welch | 96—49 X |
| 3,409,455 | 11/1968 | Halperin | 117—1.7 |
| 3,420,666 | 1/1969 | Welch et al. | 96—91 |

NORMAN G. TORCHIN, Primary Examiner

J. L. GOODROW, Assistant Examiner

U.S. Cl. X.R.

96—91